United States Patent
Johansson

(10) Patent No.: US 10,085,411 B2
(45) Date of Patent: Oct. 2, 2018

(54) PRESSURE CONTROL DEVICE FOR A MILKING MACHINE

(71) Applicant: DELAVAL HOLDING AB, Tumba (SE)

(72) Inventor: Thomas Johansson, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 240 days.

(21) Appl. No.: 15/114,120

(22) PCT Filed: Feb. 6, 2015

(86) PCT No.: PCT/SE2015/050137
§ 371 (c)(1),
(2) Date: Jul. 26, 2016

(87) PCT Pub. No.: WO2015/119566
PCT Pub. Date: Aug. 13, 2015

(65) Prior Publication Data
US 2017/0000075 A1 Jan. 5, 2017

(30) Foreign Application Priority Data

Feb. 7, 2014 (SE) ...................................... 1450129

(51) Int. Cl.
*A01J 5/04* (2006.01)
*A01J 5/12* (2006.01)
(Continued)

(52) U.S. Cl.
CPC ............... *A01J 5/048* (2013.01); *A01J 5/007* (2013.01); *A01J 5/12* (2013.01); *A01J 5/14* (2013.01)

(58) Field of Classification Search
CPC ...... A01J 5/048; A01J 5/12; A01J 5/14; A01J 5/007
See application file for complete search history.

(56) References Cited

U.S. PATENT DOCUMENTS

| 952,978 | A | * | 3/1910 | Cramp | ................. | A01J 5/0175 119/14.08 |
| 1,858,266 | A | | 5/1932 | Dinesen | | |

(Continued)

FOREIGN PATENT DOCUMENTS

| EP | 1 336 335 A2 | 8/2003 |
| EP | 1 346 630 A2 | 9/2003 |

(Continued)

OTHER PUBLICATIONS

International-Type Search Report, dated Oct. 16, 2014, from corresponding PCT application.

(Continued)

*Primary Examiner* — Joshua Daniel Huson
(74) *Attorney, Agent, or Firm* — Young & Thompson

(57) ABSTRACT

A pressure control device for a milking machine includes a housing, a vacuum inlet, and two control circuits. Each circuit includes a main vacuum passage extending through the housing from the vacuum inlet to an outlet, and a main valve configured to take one of an open position and a closed position. A pilot passage extends from the main vacuum passage and includes a pilot valve body configured to take one of an open pilot position and a closed pilot position. The pilot passage acts in the open pilot position on the main valve to move to the open position, and permits in the closed pilot position the main valve to move to the closed position. A solenoid controls the pilot valve body. A holding member receives the solenoid and is attached to the housing through a first bayonet coupling.

20 Claims, 7 Drawing Sheets

(51) Int. Cl.
*A01J 5/14* (2006.01)
*A01J 5/007* (2006.01)

(56) References Cited

U.S. PATENT DOCUMENTS

| | | | |
|---|---|---|---|
| 2,017,754 A | 10/1935 | Hodsdon | |
| 2,667,856 A * | 2/1954 | Heckendorf | A01J 5/048 119/14.18 |
| 3,837,318 A * | 9/1974 | Duncan | A01J 5/017 119/14.08 |
| 4,273,154 A * | 6/1981 | Moldenhauer | A01J 5/048 137/490 |
| 4,649,863 A * | 3/1987 | Hoefelmayr | A01J 5/044 119/14.32 |
| 4,714,048 A * | 12/1987 | Jefferies | G01F 1/56 119/14.08 |
| 4,944,249 A * | 7/1990 | Takeuchi | A01J 5/048 119/14.44 |
| 4,955,408 A * | 9/1990 | Meermoller | A01J 5/048 119/14.16 |
| 2011/0266476 A1 | 11/2011 | Schultz et al. | |

FOREIGN PATENT DOCUMENTS

| | | |
|---|---|---|
| EP | 1 731 026 A1 | 12/2006 |
| RU | 2289239 C2 | 12/2006 |
| RU | 64 855 U1 | 7/2007 |
| SU | 1708214 A1 | 1/1992 |
| WO | 98/53670 A1 | 12/1998 |

OTHER PUBLICATIONS

International Search Report, dated May 29, 2015, from corresponding PCT application.
Supplementary International Search Report, dated May 13, 2016, from corresponding PCT application.

* cited by examiner

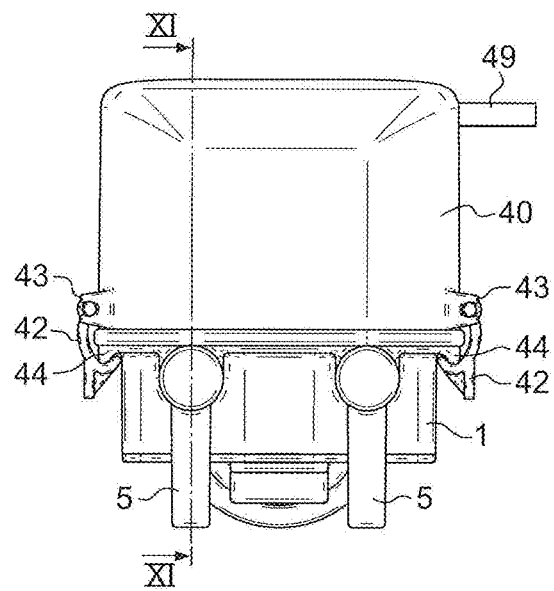
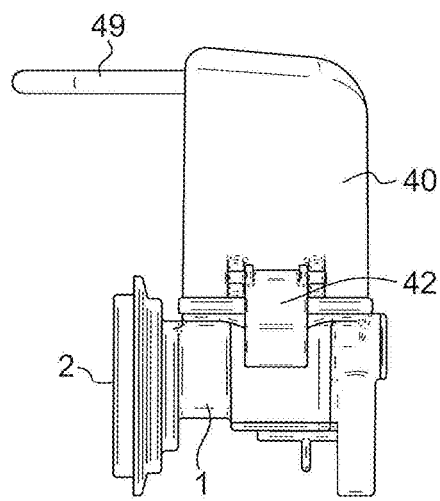
Fig. 1
Fig. 2
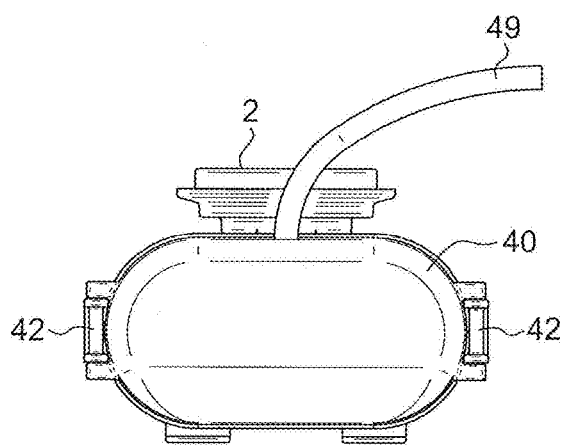
Fig. 3

PRESSURE CONTROL DEVICE FOR A MILKING MACHINE

THE TECHNICAL FIELD OF THE INVENTION

The present invention refers to a pressure control device for a milking machine, configured to provide a pulsating pressure, varying between a relatively high pressure and a relatively low pressure (vacuum). More precisely, the present invention refers to a pressure control device according to the preamble of claim 1.

Such a pressure control device may suitably be operated as a so called pulsator delivering a pulsating pressure to a pulsation chamber of a teatcup to be attached to a teat of an animal to be milked.

Pulsators having such a design are known in the technical field of milking. The pulsator may be incorporated in a milking machine. Although the functioning and the reliability of prior art pulsators are satisfactory, they do frequently suffer from the disadvantage of requiring an extensive and time-consuming maintenance for cleaning and adjusting the pulsator, and for replacing worn parts. This is at least partly due to the very many parts of the known designs, and due to the fact that tools are required for dismounting and mounting the pulsator in order to perform the maintenance.

EP-1731026 discloses a pulsator for a milking plant. The pulsator comprises a body comprising a lower part 101A, a lower intermediate 101Bi, an upper intermediate part 101Bs and a vacuum inlet 182. A control circuit comprises a main vacuum passage 182, 204, 206, 208 and a pilot passage 186, 190, 192, 194, 196. The main vacuum passage extends through the parts 101A, 101Bi, 101Bs from the vacuum inlet 182 to an outlet 208, and includes a main valve 248 configured to take one of an open position, in which the main vacuum passage is open, and a closed position, in which the main vacuum passage is closed. The pilot passage extends from the main vacuum passage and includes a pilot valve body 264 configured to take one of an open pilot position, in which the pilot passage is open, and a closed pilot position, in which the pilot passage is closed. The pilot passage acts in the open pilot position on the main valve to move the main valve to the open position, and permits in the closed pilot position the main valve to move to the closed position. A solenoid 111, 113 controls the pilot valve body of the pilot passage. An upper part 101C receives the solenoid and the pilot valve body of the pilot passage. The upper part is fixed to the underlying parts by two screws. The pilot passage extends through an opening 186 in the upper part 101C. The pilot valve body 264 is movably provided between the solenoid and the upper part 101C to abut a seat surface around the opening 186 in the closed pilot position,

SUMMARY OF THE INVENTION

The object of the present invention is to overcome the disadvantages discussed above, and to obtain a pressure control device requiring an easy and quick maintenance.

This object is achieved by the pressure control device initially defined, which is characterized in that the holding member is attached to the housing by means of a first bayonet coupling.

Such a holding member may easily be removed from the housing together with the solenoid and the pilot valve body when any one of these parts are to be replaced or when maintenance is to be performed. For the detachment, the holding member, together with the solenoid, only needs to be turned a part of a round relative to the housing thanks to the first bayonet coupling. No tool, such as a screw driver, is required for the detachment and the attachment of the holding member and the parts held by the holding member. Thus, the solenoid and the holding member form a unit, which may be easily removed, thereby creating access to parts provided beneath the solenoid and the holding member, for instance the main valve, which then may be easily removed, cleaned and/or replaced.

According to a further embodiment of the invention, the holding member together with the solenoid is rotatable relative the housing.

According to a further embodiment of the invention, the main valve is provided in the housing beneath the holding member, and comprises a membrane which is provided between the housing and the holding member. Thus, also the main valve is easily accessible for replacement and maintenance after detachment of the holding member.

According to a further embodiment of the invention, the main valve comprises a gripping member extending from the membrane. Advantageously, the gripping member is also located between the housing and the holding member. The gripping member facilitates gripping of the main valve in the housing.

According to further embodiment of the invention, the pilot valve body comprises, or is made of, a ferrous material and is disk-shaped. Such a disk-shaped pilot valve body may be light and thus easily and quickly movable to between the open pilot position and the closed pilot position. The energy consumption of the solenoid is thus reduced.

According to a further embodiment of the invention, the housing comprises at least one receiving element having an outer peripheral surface being complementary to a circular abutment surface of the holding member, thereby permitting rotation of the holding member during attachment to and detachment from the housing by means of the first bayonet coupling. Advantageously, the receiving member may comprise two or more projections to be engaged by a respective flange of the holding member. It would also be possible to provide the flanges on the receiving member and the projections on the holding member.

According to a further embodiment of the invention, the solenoid is attached to the holding member by means of a second bayonet coupling. Thus, the solenoid may be easily detached from the holding member, thereby also relieving the pilot valve body for maintenance or replacement. Advantageously, the solenoid may comprise two or more projections to be received in a respective receiving recess of the holding member. It would also be possible to provide the receiving recess on the solenoid and the projections on the holding member.

According to a further embodiment of the invention, the pressure control device comprises a cover enclosing the solenoid and the holding member. Advantageously, the cover may be attachable to the housing by means of snap locking means, for instance two snap locking elements. Also such snap locking means will contribute to reducing the time for maintenance of the pressure control device since no tools are needed for obtaining access to the interior of the pressure control device.

According to a further embodiment of the invention, the cover comprises an electric connector which is fixed to the cover and brought to electric contact with connection elements of the solenoid when the cover is attached to the housing in order to permit supply of electric control signals to the solenoid. Thus, by just putting the cover on its place on the housing, the electric contact to the solenoid will be established. The attachment and the activation of the snap locking means will secure the electric contact. No additional measures need to be taken for establishing the electric contact to the solenoid.

According to a further embodiment of the invention, the electric connector may be configured to break the electric contact to the connection elements when the cover is removed from the housing. Thus, the electric contact to the solenoid will automatically be broken when the cover is removed, which means that maintenance work may be initiated as soon as the cover has been removed without any need for specific electric disconnection of the solenoid.

According to a further embodiment of the invention, the main valve comprises a first valve body and a connecting rod connecting the membrane to first valve body. Advantageously, the membrane may have an outwardly extending flange which may be comprised by or form the gripping member, mentioned above. Such a flange may be gripped by an operator when the main valve is to be removed from the housing.

Furthermore, as stated above the membrane may be provided in the housing beneath the holding member. The membrane may then be held in the correct position by being clamped between the holding member and the housing. The membrane may have a circumferential flange resting in an annular groove in the housing. The annular groove may be provided in the receiving element.

According to a further embodiment of the invention, the main vacuum passage defines a by-pass opening to the surrounding atmosphere, wherein the first valve body is configured to abut and close the by-pass opening in the closed position.

According to a further embodiment of the invention, the main vacuum passage defines and extends through a valve seat, wherein the main valve comprises a second valve body configured to abut and close the valve seat in the open position.

According to a further embodiment of the invention, the first valve disk is connected to the second valve disk by means of the connecting rod, wherein the membrane, the first valve body, the second valve body and the connecting rod are formed as an integrated unit. Thus, the valve member may be replaced in an easy manner as one single unit.

According to a further embodiment of the invention, the pressure control device comprises two of said at least one control circuit. Such a pressure control device is especially suitable as a pulsator in a milking plant, wherein a first control circuit controls the pulsation pressure to two of the pulsation chambers of a milking member and a second control circuit controls the pulsation pressure to two other pulsation chambers of the milking member.

Advantageously, the housing may then comprise two of said at least one receiving element, one for each holding member. Furthermore, the electric connector may be brought to electrical contact with connection elements of both the solenoids when the cover is attached to the housing in order to permit supply of electric current to the solenoids.

BRIEF DESCRIPTION OF THE DRAWINGS

The present invention is now to be explained more closely through a description of various embodiments and with reference to the drawings attached hereto.

FIG. 1 discloses a front view of a pressure control device according to a first embodiment of the invention.

FIG. 2 discloses a side view of the pressure control device in FIG. 1.

FIG. 3 discloses a top view of the pressure control device in FIG. 1.

DETAILED DESCRIPTION OF VARIOUS EMBODIMENTS OF THE INVENTION

FIGS. 1-12 disclose a first embodiment of a pressure control device for a milking machine. The pressure control device of the first embodiment is suitable for being operated as a so called pulsator employed for delivering a pulsating pressure to the pulsation chambers of the teatcups of the milking member (not disclosed).

The pressure control device comprises a housing 1 and a vacuum inlet 2, which is connected or connectable to a low pressure source (not disclosed), such as a vacuum pump commonly used in milking plants for generating the milking vacuum and the pulsating pressure, or the pulsating vacuum.

Figure 4:
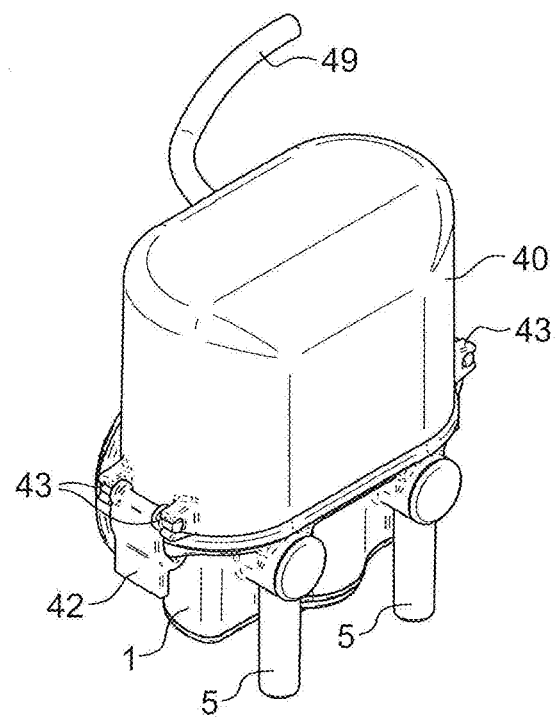
FIG. 4 discloses a perspective front view of the pressure control device in FIG. 1.
Figure 5:
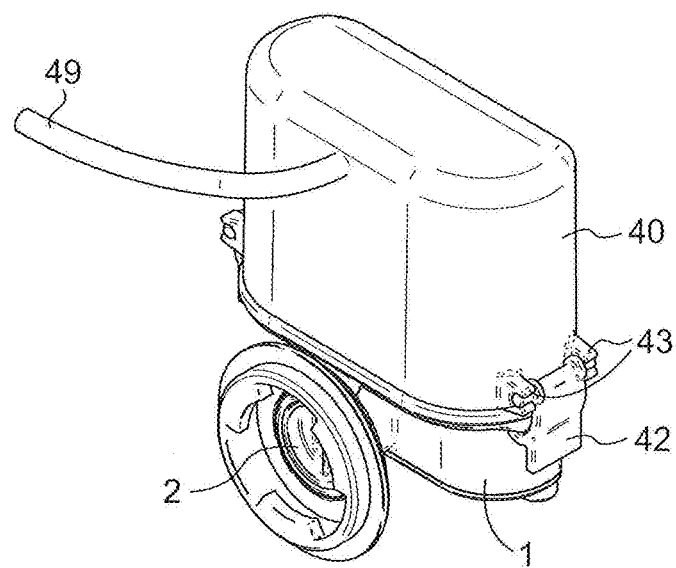
FIG. 5 discloses a perspective rear view of the pressure control device in FIG. 1.
Figure 6:
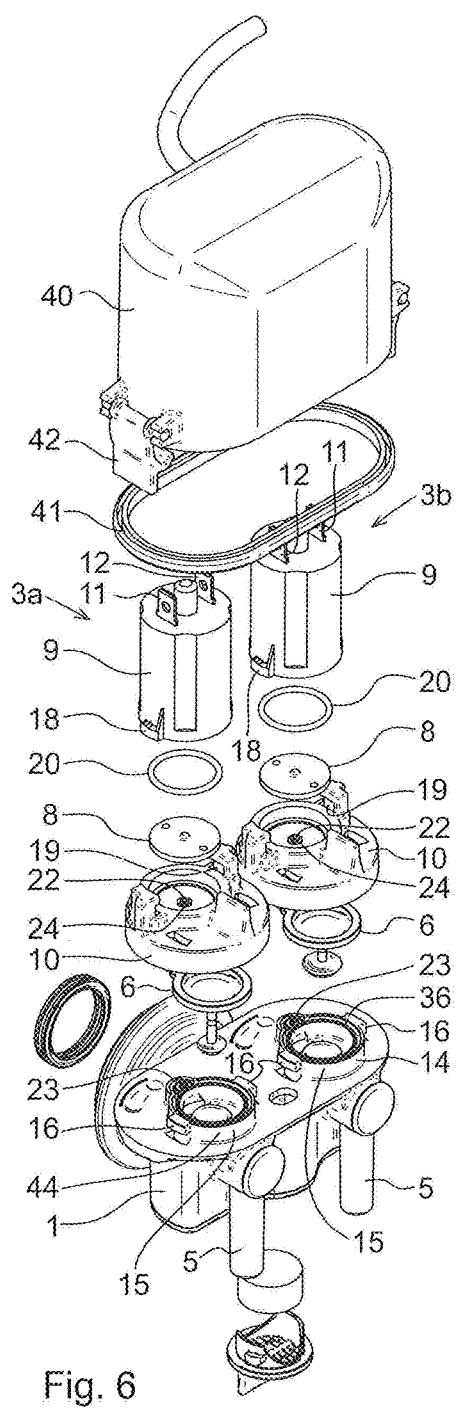
FIG. 6 discloses an exploded view of the pressure control device in FIG. 1 seen from above.
Figure 7:
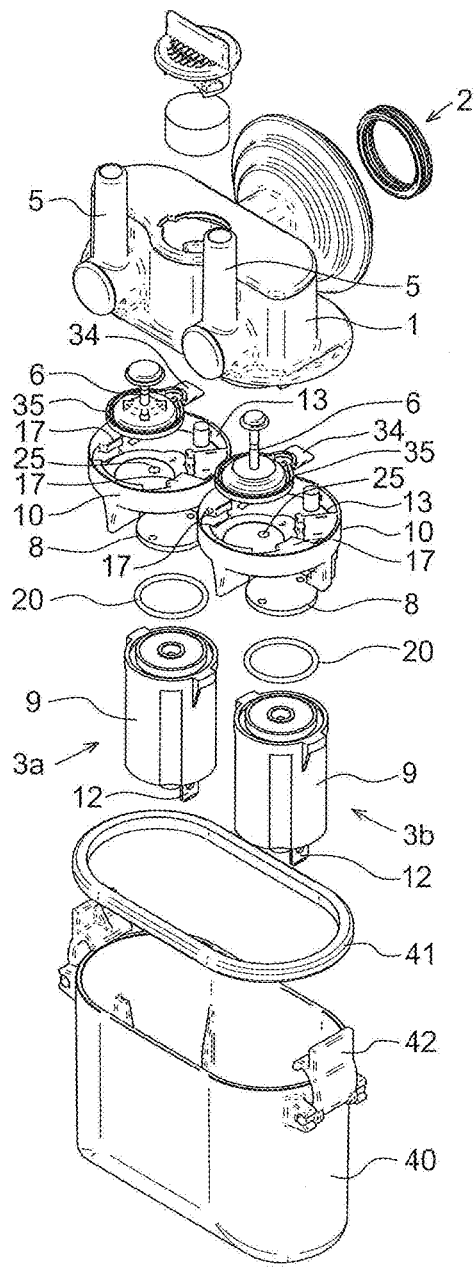
FIG. 7 discloses an exploded view of the pressure control device in FIG. 1 seen from beneath.
Figure 8:
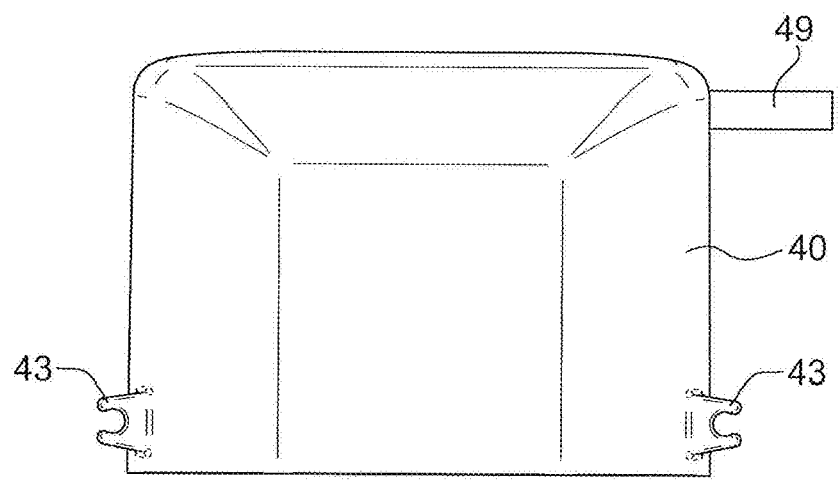
FIG. 8 discloses a front view of a cover of the pressure control device in FIG. 1.
Figure 9:
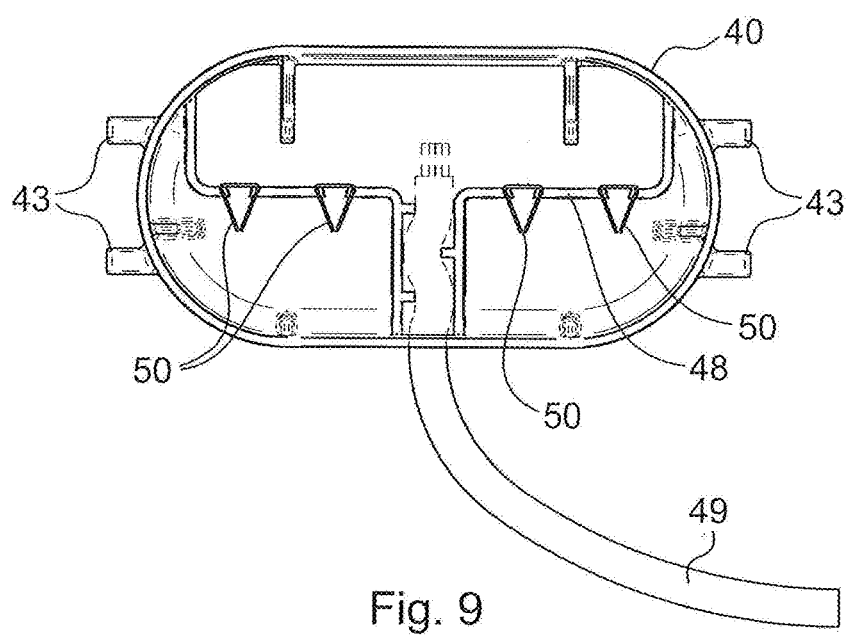
FIG. 9 discloses a bottom view of the cover in FIG. 8.
Figure 10:
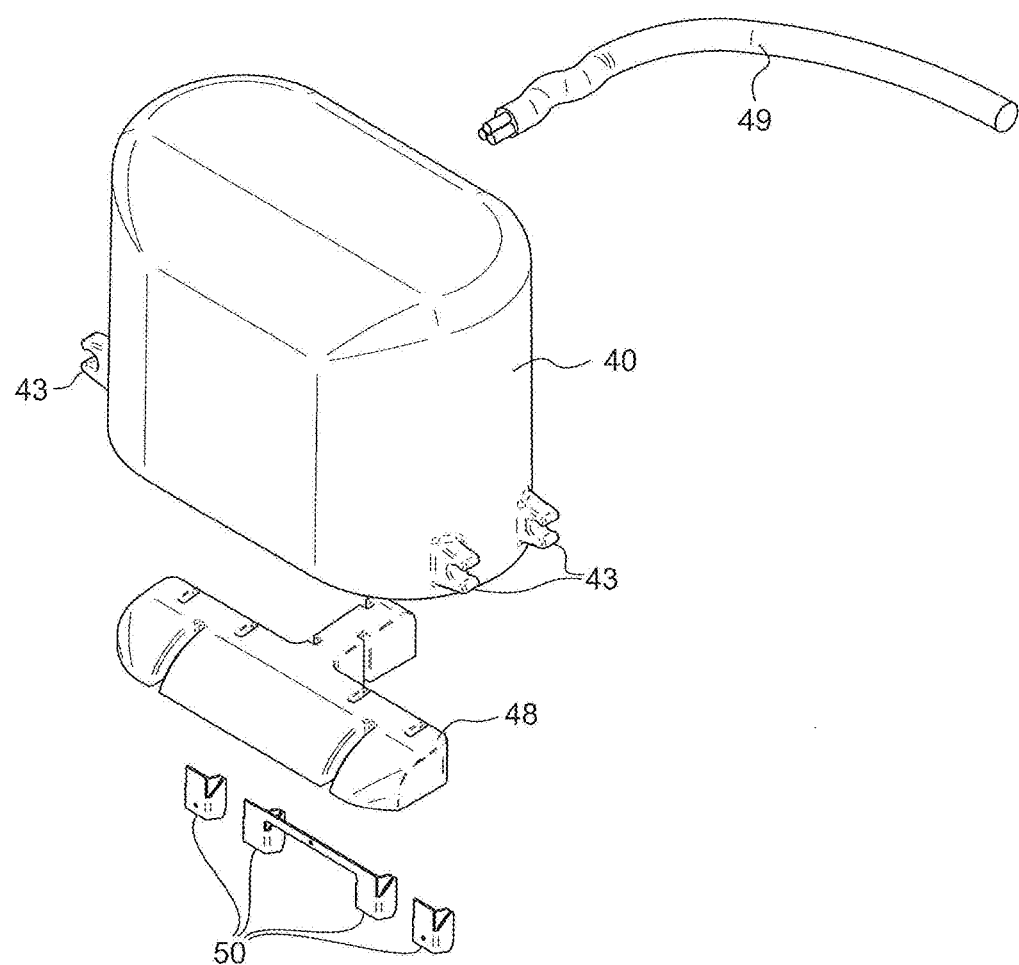
FIG. 10 discloses an exploded view of the cover in FIG. 8.

In the first embodiment, the pressure control device comprises two control circuits 3a, 3b, a first control circuit 3a and a second control circuit 3b, see FIGS. 6 and 7. Each control circuit 3a, 3b comprises a main vacuum passage 4 extending through the housing 1 from the vacuum inlet 2 to a respective outlet 5, see FIGS. 11 and 12. In FIGS. 11-14, all the spaces subjected to low pressure, or vacuum, are dashed.

The main vacuum passage 4 includes a main valve 6 configured to take one of a open position, in which the main vacuum passage 4 is open, and a closed position, in which the main vacuum passage 4 is closed.

Each control circuit 3a, 3b also comprises a pilot passage 7 extending from the main vacuum passage 4 and including a pilot valve body 8 configured to take one of an open pilot position, in which the pilot passage 7 is open, and a closed pilot position, in which the pilot passage 7 is closed.

Figure 11:
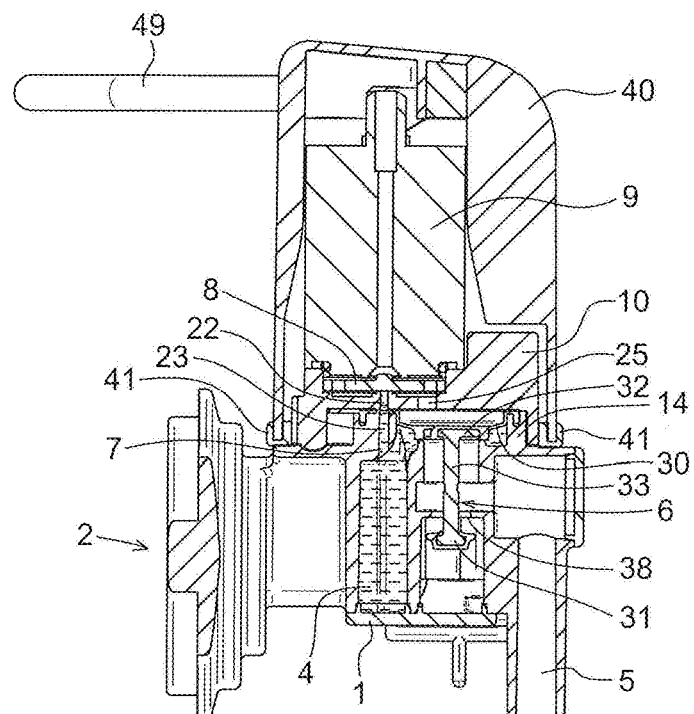
FIG. 11 discloses a sectional view of the device along the line XI-XI in FIG. 1, wherein a main vacuum passage of the pressure control device is in a closed position.
Figure 12:
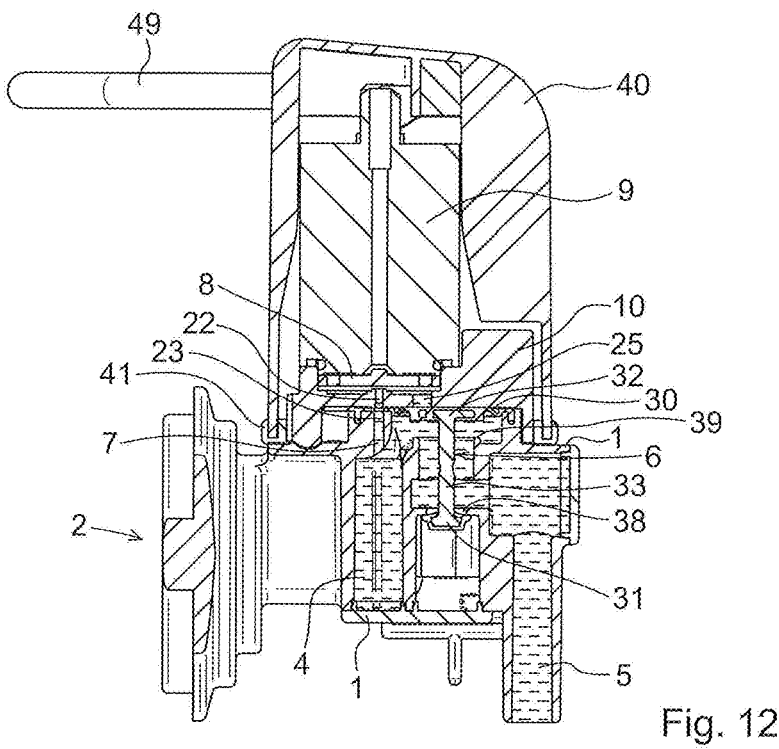
FIG. 12 discloses a sectional view of the device along the line XI-XI in FIG. 1, wherein the main vacuum passage of the pressure control device is in an open position.

In the first embodiment, the pilot passage 7 acts in the open pilot position on the main valve 6 to move the main valve 6 to the open position, to permit the low pressure to pass from the inlet 2 to the outlet 5, see FIG. 12. In the closed pilot position, the pilot passage 7 permits the main valve 6 to move to and remain in the closed position, to close the main vacuum passage 4, see FIG. 11.

Furthermore, each control circuit 3a, 3b comprises a solenoid 9 controlling the pilot valve body 8 of the pilot passage 7, and a holding member 10, see FIGS. 6 and 7. Each solenoid 9 comprises two electrical connections 11 and 12 for the supply of electric current in the form of electric control signals to the solenoid 9. When the solenoid 9 is activated, i.e. supplied with electric current, the pilot valve body 8, which may comprise a ferrous material, is lifted, or pulled, towards the solenoid 9, i.e. to the open pilot position.

Each holding member 10 is configured for receiving the solenoid 9 and the pilot valve body 8 of the pilot passage 7. The main valve 6 is provided in the housing 1 beneath the holding member 10.

Each holding member 10 has a circular abutment surface 13 and is attached to the housing 1 by means of a first bayonet coupling, see FIG. 7. The housing 1 comprises two receiving elements 14 one for each holding member 10, see FIG. 6. Each receiving element 14 has an outer peripheral surface 15, having a circular shape, which is complementary to the circular abutment surface 13 of the holding member 10. The circular abutment surface 13 and the outer peripheral surface 15 permit rotation of the holding member 10 during attachment to and detachment from the respective receiving element 14 of the housing 1.

The first bayonet coupling comprises or is formed by two projections 16 projecting outwardly from the outer peripheral surface 15, see FIG. 6, and two flanges 17 projecting inwardly from the circular abutment surface 13, see FIG. 7. The projections 16 may be provided opposite to each other. Also the flanges 17 may then be provided opposite each other. During the attachment and the above mentioned rotation of the holding member 10, each projection is 16 engaged by a respective one of the flanges 17 of the holding member 10. It is possible to let the first bayonet coupling comprise more than two projections 16 on the receiving element 14, and more the two flanges 17 on the holding member 10.

The solenoid 9 is attached to the holding member 10 by means of a second bayonet coupling. The second bayonet coupling comprises or is formed by two projections 18 extending from an outer surface of the solenoid 9 and two receiving recesses 19 provided in or on the holding member 10, see FIG. 6. The projections 18 may be provided diametrically opposite to each other. Thus, also the receiving recesses 19 may be provided diametrically opposite to each other. It is possible to let the second bayonet coupling comprise more than two projections 18 on the solenoid and more the two receiving recesses 19 on the holding member 10.

The solenoid 9 is pressed against the holding member 10 by means of the second bayonet coupling through rotation of the solenoid 9 until the projections 18 are engaged by the receiving recesses 19.

A space, which forms a part of the pilot passage 7, is provided between the solenoid 9 and the holding member 10, see FIGS. 11 and 12. The pilot valve body 8 is provided in this space. The pilot valve body 8 may be disk-shaped.

A sealing ring 20 may be provided between the solenoid 9 and the holding member 10 to seal the space.

The pilot passage 7 extends through an upstream opening 22 through the holding member 10, see FIGS. 6, 11 and 12, connecting the space and the main vacuum passage 4 via a connection channel 23. The pilot valve body 8 is thus movably provided in the space between the solenoid 9 and the holding member 10 and will abut a seat surface 24 around the upstream opening 22 when the pilot valve body 8 is in the closed pilot position.

The pilot passage 7 also comprises a downstream opening 25 through the holding member 10, see FIGS. 7, 11 and 12.

The main valve 6 comprises a membrane 30, a first valve body 31, a second valve body 32 and a connecting rod 33, see FIGS. 11 and 12. The membrane 30, the first valve body 31, the second valve body 32 and the connecting rod 33 are formed as an integrated unit.

The main valve 6 also comprises a gripping member 34 to facilitate gripping of the main valve 6 in the housing 1, and thus removal of the main valve 6 from the housing 1, see FIG. 7. The gripping member 34 may comprise an outwardly extending flange which extends from the membrane 30, and which may be made in the same material as the membrane 30.

The second valve body 32 is formed by or incorporated in the membrane 30. The connecting rod 33 connects the membrane 30, and thus the second valve body 32, to the first valve body 31, which is thus provided at a distance from the second valve body 32 and the membrane 30.

The membrane 30 is provided in the housing 1 beneath the holding member 10. The membrane 30 is held in the correct position by being clamped between the holding member 10 and the housing 1. The membrane 30 has a circumferential flange 35, see FIG. 7, extending downwardly. When the main valve 6 is provided in the housing 1, the circumferential flange 35 is provided and rests in an annular groove 36 in the receiving element 14 of the housing 1, see FIG. 6.

The downstream opening 25 through the holding member 10 extends from the space between the solenoid 9 and the holding member 10 to a position above the membrane 30, see FIGS. 11 and 12. The pilot passage 7 thus comprises the connection channel 23, the upstream opening 22, the space and the downstream opening 25. In the open pilot position, low pressure, or vacuum, will thus prevail in the pilot passage 7, which exerts a lifting force on the membrane 30 and the main valve 6, see FIG. 12.

The main vacuum passage 4 defines a by-pass opening 38 connecting the main vacuum passage 4 to the surrounding atmosphere, see FIGS. 11 and 12. The first valve body 31 of the main valve 6 is configured to either open or close, and then abut, the by-pass opening 38. In the first embodiment, see FIGS. 11 and 12, the first valve body 31 is provided outside the by-pass opening 38, and configured to close the by-pass opening 38 in the open position, i.e. when the main vacuum passage 4 is open from the inlet 2 to the outlet 5, see FIG. 12. When the first valve body 31 is moved from the by-pass opening 38, air at atmospheric pressure may pass from the surrounding atmosphere to the outlet 5, see FIG. 11.

The main vacuum passage 4 also defines a valve seat 39 through which the main vacuum passage 4 extends, see FIG. 11. In the first embodiment, the second valve body 32 of the main valve 6 is configured to abut and close the valve seat 39 in the closed position, see FIG. 11, wherein the main vacuum passage 4 is closed. At the same time, the first valve body 31 is lifted from the by-pass opening 38 which thus is opened to permit air at atmospheric pressure to pass to the outlet 5. When the second valve body 32 is lifted from the valve seat 39, through opening of the pilot passage 7, the first valve body 31 is moved to abutment with the by-pass opening 38, i.e. the by-pass opening is closed and the main vacuum passage 4 is open from the inlet 2 to the outlet 5, see FIG. 12.

The pressure control device also comprises a cover 40 enclosing the solenoids 9 and the holding members 10. A gasket 41 may be provided between the cover 40 and the housing 1 to seal the interior of the pressure control device.

The cover 40 is attachable to the housing 1 by means of snap locking means, see FIGS. 1-5. In the embodiments disclosed, the snap locking means comprises two snap locking elements 42. The two snap locking elements 42 may be provided opposite to each other on the cover 40. Each snap locking element 42 is rotatably attached to the cover 40 by means of an engagement member 43.

Each snap locking element 42 is rotatable between an open state, in which the cover 40 may be removed from the housing 1, and a closed state, in which the snap locking element 42 is engaging a protrusion 44 on the housing 1. In the closed state, the cover 40 is thus attached, or firmly attached to the housing 1.

The cover 40 comprises an electric connector which comprises a plurality of clamping elements 50, in the embodiments disclosed four clamping elements 50. The electric connector with the clamping elements 50 is fixed to the cover 40, see FIGS. 9 and 10, by means of a holder 48 of an electrically insulating material. The clamping elements 50 of the electric connector are connected to an electric supply line 49 extending through the cover 40 and connected or connectable to a control unit (not disclosed) for supply of electric control signals to the solenoids 9.

The clamping elements 50 of the electric connector will be brought to electric contact with connection elements 11, 12 of each solenoid 9 when the cover 40 is put in place on and attached to the housing 1. Each of the clamping elements 50 is configured to engage a respective one of the connection elements 11, 12 when the cover 40 is attached to the housing 1. Each clamping element 50 is attached to the holder 48 and connected to the electric supply line 49. When the cover 40 is attached to the housing 1 electric current, such as in the form of the electric control signals, may thus be supplied to the solenoids 9.

Consequently, when the cover 40 is removed from the housing 1, the electric connector will be removed from the connection elements 11, 12 and the electric contact with the solenoids 9 will be broken.

The pressure control device of the first embodiment is thus suitable as a pulsator in a milking plant. The first control circuit 3a may then control the pulsating low pressure, or vacuum, to two of the pulsation chambers of the milking member, whereas the second control circuit 3b may control the pulsating low pressure, or vacuum, to two other pulsation chambers of the milking member. The first control circuit 3a is then advantageously controlled to be in the open position when the second control circuit 3b is controlled to be in the closed position, and vice versa, by means of the control unit mentioned above.

Figure 13:
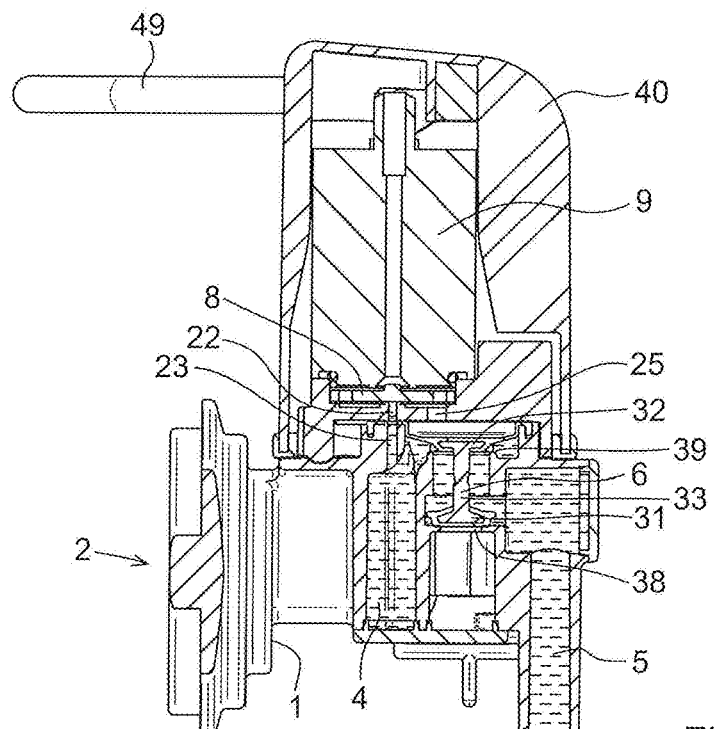
FIG. 13 discloses a sectional view of a pressure control device according to a second embodiment of the invention, similar to the view in FIG. 11, wherein the main vacuum passage of the pressure control device is in an open position.
Figure 14:
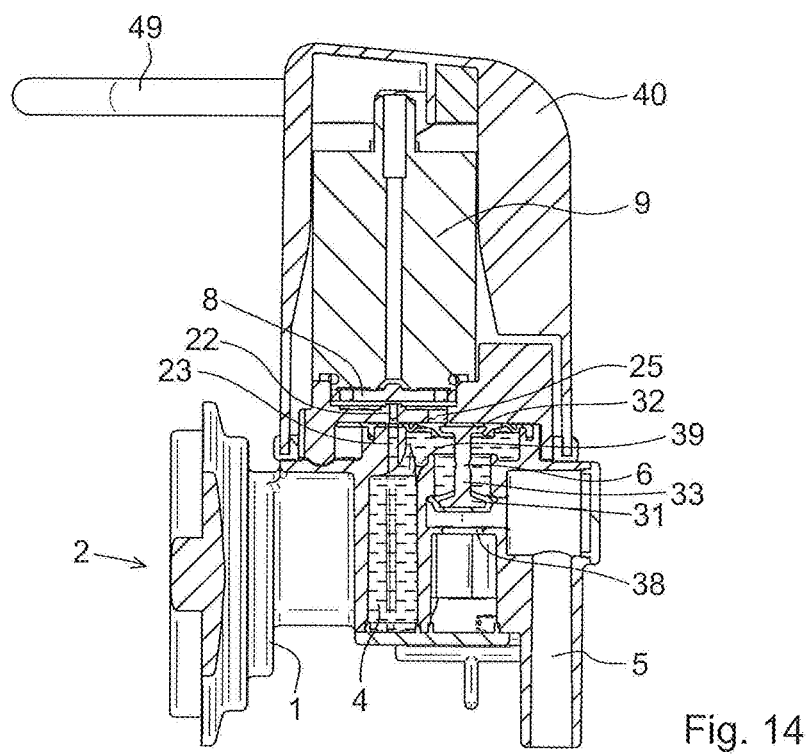
FIG. 14 discloses a sectional view of the device in FIG. 13, similar to the view in FIG. 11, wherein the main vacuum passage of the pressure control device is in a closed position.

FIGS. 13 and 14 illustrates a second embodiment, which is an inverted variant of the pressure control device of the first embodiment. The same reference signs have been used in all embodiments for designating the same or similar elements.

Such an inverted variant of the pressure control device may be used as control valve for controlling various functions in a milking plant. This is advantageous when low pressure or atmospheric pressure is the default state, and changing of pressure is made during a short period of time for controlling a specific function or apparatus, such as a retracting device for retracting the milking member from the teats when the milking has been finished.

In the second embodiment, the pilot passage 7 acts in the open pilot position to move the main valve 6 to the closed position, see FIG. 14, and in the closed pilot position permits the main valve 6 to move to and remain in the open position, see FIG. 13.

In the second embodiment, the first valve body 31 of the main valve 6 is provided inside the by-pass opening 38, but not outside the by-pass opening 38 as in the first embodiment. Furthermore, the second valve body 32 never come to abutment against the valve seat 39, as can be seen in FIG. 13.

The connecting rod 33 of the main valve 6 is thus somewhat shorter than the connecting rod 33 of the main valve of the first embodiment. Since the housing 1 is identical in the first embodiment and the second embodiment, the pressure control device of the first embodiment may be adjusted to provide the inverted function only by replacing the main valve 6 to the one disclosed for the second embodiment.

In the first and second embodiments, the pressure control device has been provided with two control circuits 3a, 3b. It should be noted, however, that the pressure control device may be realized also with only one control circuit, i.e. one solenoid 9, one holding member 10, one receiving member 14 etc. Such a pressure control device may also be used in a milking machine for controlling the pulsating pressure or vacuum of one or more teatcups of the milking member. In the inverted variant, the pressure control device with one control circuit may advantageously be used as control valve for controlling various functions in a milking plant.

The present invention is not limited to the embodiments disclosed but may be varied and modified within the scope of the following claims.

The invention claimed is:

1. A pressure control device for a milking machine, comprising:
   a first bayonet coupling comprising a first part (16) and a second part (17);
   a housing (1) with a vacuum inlet (2) located at a first side of the housing (1), a vacuum outlet (5) located at a second side of the housing (1), and the first part (16) of the first bayonet coupling being located along an exterior surface extending between the first and second sides of the housing; and
   at least one control circuit (3a, 3b) comprising
   i) a main vacuum passage (4) that extends through the housing (1) from the vacuum inlet (2) to the outlet (5), and includes a main valve (6) that moves between an open position, in which the main vacuum passage (4) is open, and a closed position, in which the main vacuum passage (4) is closed,
   ii) a pilot passage (7) that extends from the main vacuum passage (4) and includes a pilot valve body (8) that moves between an open pilot position, in which the pilot passage (7) is open, and a closed pilot position, in which the pilot passage (7) is closed, wherein the pilot passage (7) in the open pilot position acts on the main valve (6) to move the main valve (6) to one of the open position and the closed position, and in the closed pilot position permits the main valve (6) to move to the other of the open position and the closed position,
   iii) a solenoid (9) controlling the pilot valve body (8) of the pilot passage (7), and
   iv) a holding member (10) including a first side and an opposite second side, the solenoid (9) being held to the first side of the holding member (10), wherein the pilot passage (7) extends through an opening (22) in the holding member (10) and wherein the pilot valve body (8) is movably provided between the solenoid (9) and the holding member (10) to abut a seat surface (24) around the opening (22) in the closed pilot position, and v) the second part (17) of the first bayonet coupling being located on the second side of the holding member (10), wherein the first part (16) and the second part (17) of the first bayonet coupling engage to hold the at least one control circuit (3a, 3b) against the housing, and rotation of the holding member (10) releases the at least one control circuit (3a, 3b), including the solenoid held to the holding member (10), from the housing.

2. The pressure control device according to claim 1, wherein, the main valve (6) is provided in the housing (1) beneath the holding member (10) facing the second side of the holding member (10), and the main valve (6) comprises a membrane (30) which is provided between the housing (1) and the holding member (10).

3. The pressure control device according to claim 2, wherein the main valve (6) comprises a gripping member (34) extending from the membrane (30).

4. The pressure control device according to claim 2, wherein the main valve (6) comprises a first valve body (31) and a connecting rod (33) connecting the membrane (30) to first valve body (31).

5. The pressure control device according to claim 4, wherein the main vacuum passage (4) defines a by-pass opening (38) to surrounding atmosphere, and wherein the first valve body (31) is configured to abut and close the by-pass opening (38) in the open position.

6. The pressure control device according to claim 4, wherein the main vacuum passage (4) defines and extends through a valve seat (39), and wherein the main valve (6) comprises a second valve body (32) configured to abut and close the valve seat (39) in the closed position.

7. The pressure control device according claim 6, wherein the first valve body (31) is connected to the second valve body (32) by the connecting rod (33) and wherein the membrane (30), the first valve body (31), the second valve body (32) and the connecting rod (33) are an integrated unit.

8. The pressure control device according to claim 1, wherein the pilot valve body comprises a ferrous material and is disk-shaped.

9. The pressure control device according to claim 1, wherein, the holding member includes a circular abutment surface (13) located on the second side of that the holding member, the second part (17) of the first bayonet coupling being located within the circular abutment surface (13), the housing (1) further comprises at least one receiving element (14) having an outer peripheral surface (15) being complementary to the circular abutment surface (13) of the holding member (10), the outer peripheral surface (15) including the first part (16) of the first bayonet coupling, and rotation of the holding member (10) during attachment to and detachment from the housing (1) engages and disengages the first part (16) and the second part (17) of the first bayonet coupling (16, 17).

10. The pressure control device according to claim 1, wherein the solenoid (9) is attached to the holding member (10) by a second bayonet coupling (18, 19) having a first part located on the solenoid (9) and a second part located on the first side of the holding member (10).

11. The pressure control device according to claim 1, further comprising a cover (40) enclosing the solenoid (9) and the holding member (10).

12. The pressure control device according to claim 11, wherein the cover (40) is attachable to the housing (1) by a snap lock (42, 43, 44).

13. The pressure control device according to claim 12, wherein the cover (40) comprises an electric connector (50) which is fixed to the cover (40) and brought to electric contact with connection elements (11, 12) of the solenoid (9) when the cover (40) is attached to the housing (1) in order to permit supply of electric control signals to the solenoid (9).

14. The pressure control device according claim 13, wherein the electric connector (50) is configured to break the electric contact with the connection elements (11, 12) when the cover (40) is removed from the housing (1).

15. The pressure control device according to claim 11, wherein the cover (40) comprises an electric connector (50) which is fixed to the cover (40) and brought to electric contact with connection elements (11, 12) of the solenoid (9) when the cover (40) is attached to the housing (1) in order to permit supply of electric control signals to the solenoid (9).

16. The pressure control device according to claim 1, wherein the pressure control device comprises two of said at least one control circuit (3a, 3b).

17. The pressure control device according to claim 1, wherein, the holding member includes a circular abutment surface (13) located on the second side of the holding member, the second part (17) of the first bayonet coupling being two flanges projecting inwardly from the circular abutment surface (13), the housing (1) further comprises a receiving element (14) having an outer peripheral surface (15) being complementary to the circular abutment surface (13) of the holding member (10), the first part (16) of the first bayonet coupling being two projections (16) projecting outwardly from the outer peripheral surface (15), and rotation of the holding member (10) during attachment to and detachment from the housing (1) engages and disengages the two projections (16) and the two flanges (17) of the first bayonet coupling (16, 17).

18. The pressure control device according to claim 17, wherein the solenoid (9) is attached to the holding member (10) by a second bayonet coupling (18, 19) comprised of two projections (18) extending from an outer surface of the solenoid (9) and two receiving recesses (19) provided the first side of the holding member (10).

19. The pressure control device according to claim 17, wherein the solenoid (9) is attached to the holding member (10) by a second bayonet coupling (18, 19) comprised of two projections (18) and two receiving recesses (19).

20. The pressure control device according to claim 1, wherein, the holding member includes a circular abutment surface (13) extending from the second side of the holding member, the second part (17) of the first bayonet coupling being within the circular abutment surface (13), and the housing (1) further comprises a receiving element (14) having an outer peripheral surface (15) being complementary to the circular abutment surface (13) of the holding member (10), the first part (16) of the first bayonet coupling being attached to the receiving element (14).

\* \* \* \* \*